United States Patent [19]

van Ligten

[11] 4,362,368

[45] Dec. 7, 1982

[54] PROGRESSIVE POWER OPHTHALMIC LENS HAVING WIDE TRANSITION CORRIDOR

[76] Inventor: Raoul F. van Ligten, No. 43 Woodleigh Park, Singapore, 1335, Singapore

[21] Appl. No.: 150,069

[22] Filed: May 15, 1980

[51] Int. Cl.³ ................................................ G02C 7/06
[52] U.S. Cl. .................................................... 351/169
[58] Field of Search ......................................... 351/169

[56] References Cited

U.S. PATENT DOCUMENTS

| | | | |
|---|---|---|---|
| 3,711,191 | 1/1973 | Tagnon | 351/169 |
| 3,785,724 | 1/1974 | Cretin-Maitenaz | 351/169 |
| 4,253,747 | 3/1981 | Maitenaz | 351/169 |
| 4,274,717 | 6/1981 | Davenport | 351/169 |
| 4,307,945 | 12/1981 | Kitchen et al. | 351/169 |

Primary Examiner—John K. Corbin
Assistant Examiner—Scott J. Sugarman
Attorney, Agent, or Firm—Robert G. Slick

[57] ABSTRACT

The lens of the present invention is a progressive power lens having a top portion for distance viewing and a bottom portion for close-up vision with a continuous transition corridor between the top and bottom portions. The lens is characterized by having a very wide transition corridor as contrasted with prior art lenses.

4 Claims, 4 Drawing Figures

PROGRESSIVE POWER OPHTHALMIC LENS HAVING WIDE TRANSITION CORRIDOR

SUMMARY OF THE INVENTION

For many years it has been recognized that conventional bifocal or even trifocal lenses leave much to be desired in that such lenses cause a jump in vision when going from one zone to the next and also suffer from the deficiency that very poor vision is obtained at distances intermediate the selected zones of viewing. Many inventors have worked, over the years, to achieve a continuous power lens wherein the top portion of the lens, for distance viewing, gradually blends into the bottom portion of the lens, for close-up viewing, so that there is not sudden jump between zones and also an object of any distance from infinity to a few inches can be brought into clear focus by utilizing the proper portion of the lens.

Most of the prior art devices have operated on the principle of having a central meridonal curve which is umbilic, i.e. each point on the vertical center of the lens line is spherical and therefore intrinsically anastigmatic. The main objection to such lenses is that it is impossible to provide for a transition corridor between two spherical surfaces which is of substantial width so that one ends up with a large spherical surface at the top and a large spherical surface at the bottom of the lens with a very narrow corridor of acuity connecting the two zones. The area on each side of the central meridian must of necessity be spherical leading to various kinds of aberrations if the wearer looks from side to side at an intermediate distance.

Another approach to the problem has been to provide a plurality of zones of high acuity in the lens wherein the zones are selected to be those of most use to the wearer. The difficulty with this approach is that there is no smooth transition from one zone to the next causing a jumping effect as is common with conventional bi- or trifocal lenses.

Accordingly, it is the principal object of the present invention to provide a progressive power lens wherein distance and close-up portions of the lens are connected by a relatively wide corridor of continuously variable power. Thus, the vision of the user is greatly enhanced at intermediate distances, allowing the axis of the eye to intersect at the lens surface at points horizontally disposed from the central line of the transition corridor.

In general the objects of the invention are achieved by not insisting upon zero astigmatism on the central meridonal curve, but instead, providing two or more generally parallel imaginary spaced vertical lines of zero intrinsic astigmatism near the vertical center of the lens wherein each of the lines represent zero intrinsic astigmatism and wherein the space between the lines as well as the areas at each side of the lines represent small but acceptable departures from perfect vision. In this manner, the corridor connecting the far and close-up portions of the lens can be made much wider than in the usual continuous power lens, thus greatly enhancing vision at intermediate distances and relieving the strict mounting and fitting procedures involved in the ordinary progressive power lenses. Although it is impossible to completely escape discontinuities in such a lens these will cause minimum disturbance to the wearer.

Various other objects and features of the invention will be brought out in the balance of the specification.

DESCRIPTION OF THE PREFERRED EMBODIMENTS

The present invention is predicated on the fact it is not necessary that an ophthalmic lens be perfect with respect to focus but that the ordinary user has sufficient accomodation to tolerate a refractive error of up to 0.50 diopters. Accordingly, if the lens is kept within this tolerance, the average user will experience good vision and no discomfort in using the lens.

Figure 1:
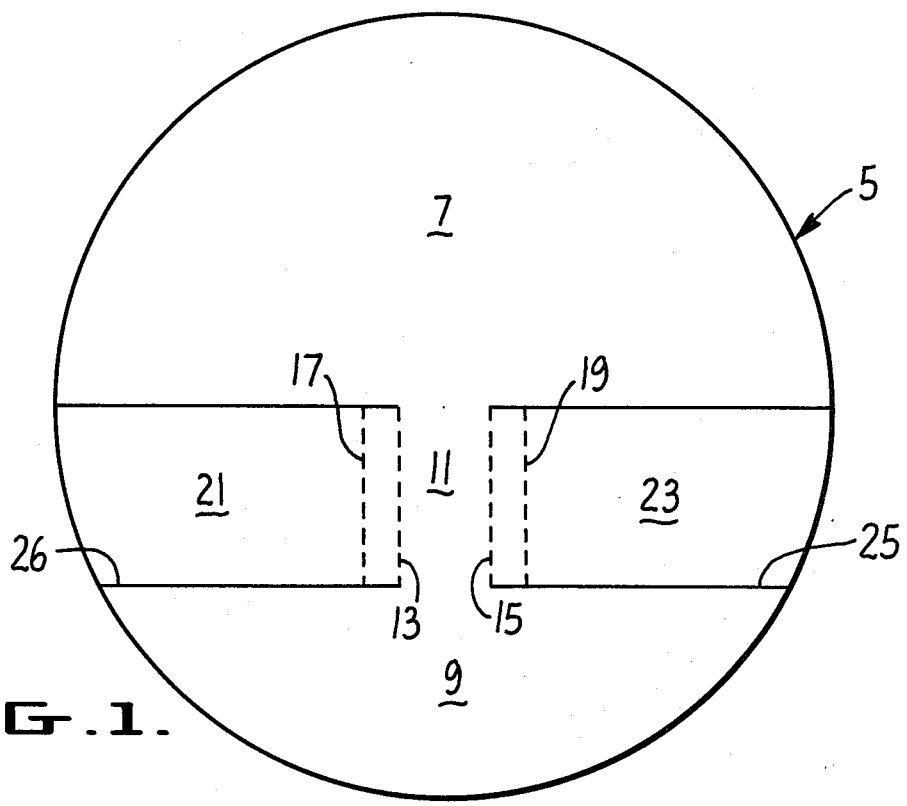
FIG. 1 is a front view of a lens embodying the present invention with various zones marked thereon.

In FIG. 1, there is shown a lens generally designated 5 having an upper portion 7 of generally spherical configuration and being adapted to correct the vision of a user for distance vision. At the bottom of the lens is a second spherical portion 9 adapted to correct the eye of the user for a normal reading distance. Between these two spherical portions is a transition corridor 11 which constitutes the crux of the present invention.

As has been said, the normal eye can accomodate an error of 0.50 diopters so that in this embodiment of the invention no attempt has been made to secure exact perfection at the center of the lens. Instead, there are two, vertical lines 13 and 15 which are spaced apart and each of the lines is umbilic so that each line can be regarded as being constituted of an infinite number of spheres graduated from the sphere 7 to the sphere 9. In the embodiment illustrated lines 13 and 15 are parallel but it is not necessary that the lines be parallel nor it is necessary that they be straight lines. It is obviously impossible to render the entire area between the lines 13 and 15 spherical so this portion of the lens is aspheric but does not depart from zero intrinsic astigmatism by preferably more than 0.50 diopters. In addition there is an area on each side of lines 13 and 15, defined by lines 17 and 19 which gives acceptable viewing. The areas on the lens designated 21 and 23 must, of necessity, depart from ideal but these areas are seldom used by the average wearer of glasses except for peripheral vision so that no great hardship results from these imperfect areas, as long as the distortion in these areas maintain vertical lines vertical and horizontal lines horizontal.

In actual practice, it has been found that the corridor of acceptable viewing, i.e. the corridor defined by the lines 17 and 19 is approximately 2½ times wider than the corridor which would be achieved had the central meridonal curve been made umbilic as in prior art lenses.

Figure 2:
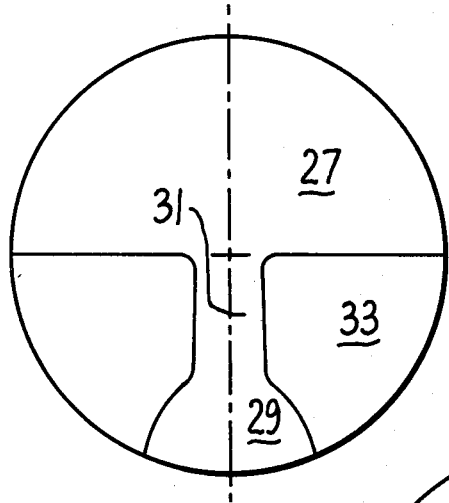
FIG. 2 represents a preferred embodiment of the invention having a transition corridor much wider than prior art lenses.
Figure 4:
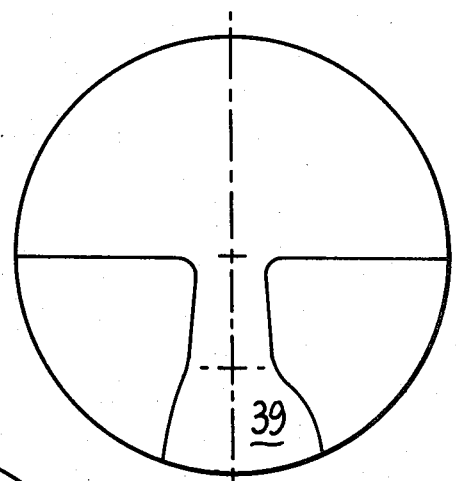
FIG. 4 shows a lens similar to that of FIG. 2 except that the reading portion has been offset to one side, the direction of the offset being selected depending upon whether the lens is to be used on the right or the left eye.
Figure 3:
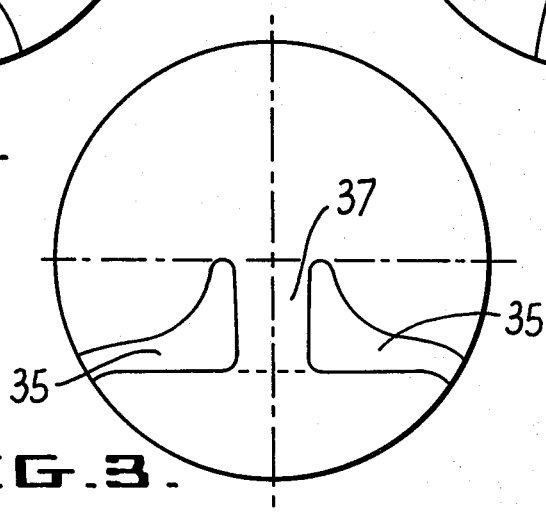
FIG. 3 represents another embodiment of the invention wherein the distortion area has been reduced from that shown in FIG. 2 but with a consequent increase in the amount of distortion in the smaller area.

The lens of FIG. 1 is used primarily to illustrate the principle of the invention and the lenses of FIGS. 2, 3 and 4 represent more practical embodiments of the invention. For instance, it is ordinarily impractical to make the close-up viewing portion of the lens as large as that shown in FIG. 1 since lines on the horizontal periphery at 25 and 26 represent such a large discontinuity that they might be unacceptable to many users. Thus the lens shown in FIG. 2 has a large distance portion 27 and a relatively small reading portion 29 connected by a wide transition corridor 31 and with a relatively large area 33 having acceptable distortion. By making the distortion area larger, the sharp discontinuities as at 25 and 26 can be avoided. The central transition corridor 31 is as described as transition corridor 11 in connection with FIG. 1.

In FIG. 3 another embodiment of the invention is shown wherein the distortion areas 35 have been greatly reduced in size with the trade off that the amount of distortion in the small area is greater than that required in lenses having a larger area of distortion. Again, however, the main object of the invention is achieved by providing a wide transition corridor 37.

The lenses so far described have been bilaterally symmetrical and in practical embodiments of the invention lenses would ordinarilly be made with the reading portion displaced to one side or the other depending upon whether the lens was to be used on the right or the left eye. Thus, in FIG. 4 the reading portion designated 39 is displaced to the right and viewed from the front of a wearer and is meant for use for the left eye.

The lens of the present invention can be made by any method well known to those skilled in the art. Preferably the lens is cast from known plastics and may or may not be coated.

Although certain specific embodiments of the invention have been described, it will be obvious that many variations can be made in the exact structure shown without departing from the spirit of this invention. For instance, for purposes of illustration, two vertical lines of zero intrinsic astigmatism have been shown with departures from zero intrinsic astigmatism between the lines. However, the object of the invention could be carried out by providing a central line of zero intrinsic astigmatism with areas of small astigmatism on each side of the central line leading to second and third vertical lines of zero intrinsic astigmatism on each side of the central line. Thus the central corridor could be made even wider than that illustrated.

The subject matter to be claimed is:

1. A progressive power lens having a top portion for distance viewing and a bottom portion for close-up viewing, said top and bottom portions being connected by at least one corridor of continuously varying power, said power varying from the distance portion to the close-up portion, said corridor being a transition zone defined by at least two spaced generally vertical curves wherein said two spaced curves are umbilic and the portion of the lens corridor between said curves departs from zero intrinsic astigmatism, said departure being no greater than 0.50 diopters, said lens having nonumbilic areas horizontally spaced on each side of said corridor.

2. The lens of claim 1 wherein two spaced vertical lines define said corridor.

3. The lens of claim 2 wherein said lines are substantially parallel.

4. The lens of claim 3 wherein the close up portion of the lens is offset from the center of the lens.

* * * * *